… … …

United States Patent Office 3,824,173
Patented July 16, 1974

3,824,173
DISMANTLEABLE BIPOLAR ELECTRODES INCLUDING ELECTRICAL CONTACT MEANS BETWEEN THE ELECTRODE PORTIONS
Pierre Bouy, 36 Bld Sadi Carnot, Enghien-les-Bains, France, and Guillaume Malzac, Residence Le San Marco, Quai Alsace Lorraine T5, Martigues, France
Filed Dec. 13, 1972, Ser. No. 314,783
Claims priority, application France, Dec. 22, 1971, 7146072
Int. Cl. B01k 3/04
U.S. Cl. 204—284     14 Claims

ABSTRACT OF THE DISCLOSURE

Dismantleable bipolar electrodes are provided of which the anodically active portion comprises titanium or other film-forming metal or alloy of similar anodic properties covered with a conducting layer, and of which the cathodically active portion comprises a common metal such as mild steel. Said electrodes are characterized by the separation in space of said active portions, at least one of which is apertured or foraminous, and by the electrical connection between said portions, which is achieved by means of two series of parts, each of said series being mechanically and electrically secured to one of said portions, the corresponding parts of each series being of shapes such that once connected in order to form pairs of parts, said pairs have a sealed cavity for housing a device or means for establishing electrical contact between the two parts of each pair.

These electrodes are particularly suited for being mounted in cells of the filter-press type, for the electrolysis of brines.

BACKGROUND OF THE INVENTION

This invention concerns dismantleable bipolar electrodes of which the anodically and cathodically active portions are separated in space.

The advantages of bipolar electrodes are known. When electrically connected in series they permit high power to be used for a given floor area and simplify the supplying of electricity. This type of electrode has long been known. The active portions thereof can be planar or can be of other shapes, for example corrugated, in order to increase their electrolysis surface area.

However, the early types proposed could use only a small number of materials available at that time, which, because of their cost or their deficiency in respect of mechanical and electrical properties, did not permit satisfactory solutions to be achieved, at least as regards some uses such as the electrolysis of alkaline chloride solutions for producing therefrom chlorine and alkaline lyes.

The possibility of using for electrolysis purposes metals of suitable anodic behaviour, such as the film-forming metals, including titanium, zirconium, tantalum, niobium and tungsten, and also alloys of such metals, when covered with thin layers of precious metals, has also long been known. However, it is only since titanium has become the most commonly available metal of this group, owing to its use in large quantities for other purposes, that numerous electrolytic devices using titanium have been proposed. Besides metals of the platinum series, including platinum per se. and rhodium, the electrolytically active conducting layers can be oxides of such metals or mixtures of various oxides. Moreover, the electrolysis industry is at present proposing a certain number of mixed semifinished products such as bars formed by metals which are good conductors, such as copper or aluminum, sheathed with metals such as titanium or alloys of similar anodic properties, the use of which makes it possible considerably to reduce the voltage drops in various component portions of metal anodes.

However, the use in electrolysis of titanium or other film-forming metals or alloys of similar anodic behavior, permits a very substantial increase in the current densities, so that solutions must be found for the problems of discharging the gases produced, such solutions comprising for example the use of apertured electrodes. In the case of bipolar electrodes, this leads to separation of the anodically and cathodically active portions. As disclosed in concurrently filed application, Ser. No. 314,728, entitled "Bipolar Electrodes," corresponding to an earlier French patent application of one of applicants with Daniel Collard, filed Dec. 21, 1971 under the No. 7,145,861, the applicants propose electrodes in which the electrolytically-active portions, which can be planar or of any other shape, for example, corrugated. At least one of the portions is apertured, and connected electrically and mechanically by means of mixed parts of common metal, which can be used cathodically, such as mild steel, plated with titanium or other film-forming metal or alloy of similar anodic properties. There is a partition separating the electrolytically-active portions in order to prevent attack and untimely current leakage.

Various other embodiments of bipolar electrodes with non-planar electrolytically-active portions have been proposed, wherein the latter are mounted on respective sides of a partition by means of screw-threaded parts, for example, which makes them dismantleable. These solutions, which are satisfactory from the mechanical point of view, are less so from the electrical point of view, owing to the dubious passage of the current which, according to the quality of the contacts made, passes to a greater or lesser extent between conducting surfaces which are tightened together, and by way of the body of the screw-threaded parts of the assembly. This means that the resistances of such contacts are always relatively high, are not always the same for the different points at which contact is made in the same electrode, and moreover develop difficulty in use.

It is an object of the present invention to provide dismantleable bipolar electrodes which are free from the foregoing defects.

It is another object of the present invention to provide bipolar electrodes which are readily dismantled.

Other objects of the invention will be apparent to those skilled in the art from the present description, taken in conjunction with the appended drawings, in which.

GENERAL DESCRIPTION OF THE INVENTION

Figure 1:
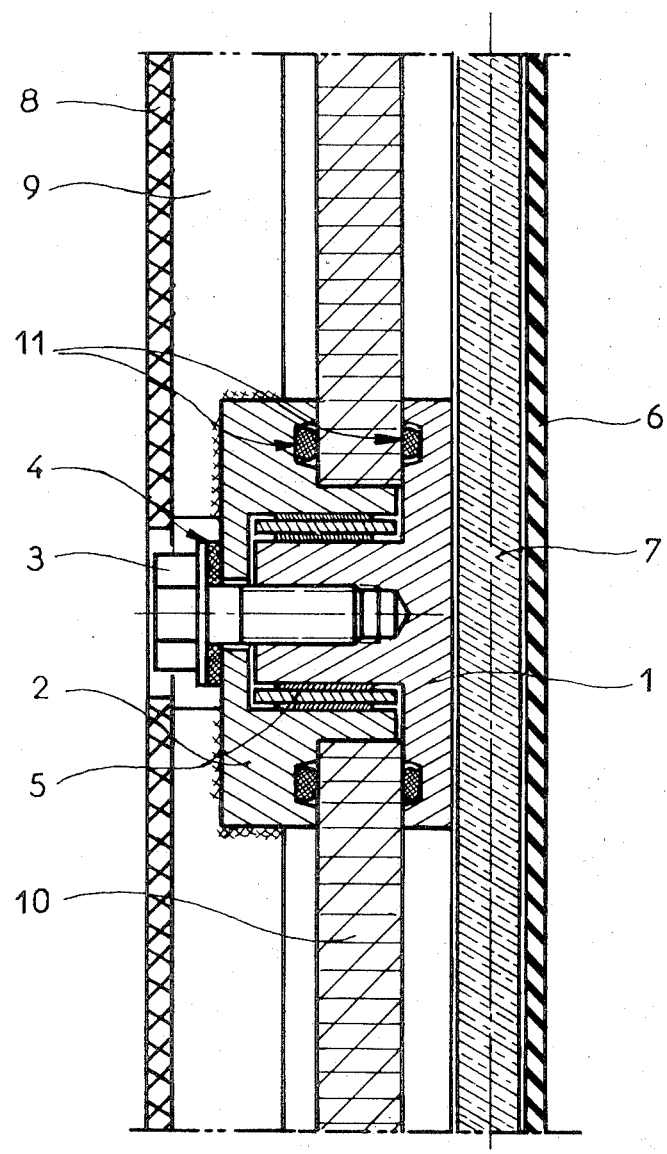
FIG. 1 is a section of a portion of a bipolar electrode of the invention.

The present applicants have been able to overcome these very serious disadvantages of the prior art dismantleable bipolar electrodes, by specially designed electrical connections between the anodically and cathodically active portions of the electrode. The proposed novel type of bipolar electrode concerns electrodes in which the anodically active portion comprises titanium or a similar film-forming metal or alloy, covered with a thin unattackable, corrosion-resistant conducting layer, and the cathodically active portion comprises a suitable metal, such as mild steel or nickel, which anodically and cathodically active portions are separated in space and can be of any shape, although in most cases planar or corrugated shapes are preferred, at least one of said portions being apertured of a foraminous nature. The electrical connection between said portions is produced by welding on to each one, directly or by the intermediary of spacer means, which, on the anodic side, can comprise metals which are good electrical conductors, sheathed with titanium or similar film-forming metals or alloys, series of parts, said parts of each electrolytically active portion corresponding to respective parts of the other portion. Each pair of parts thus formed by bringing said parts together and tightening them to each other, defines a cavity for receiving a device or means for establishing an electrical contact between the two parts of the pair in question.

The attraction of such a construction is that it makes the contacts independent of the tightening of the parts, such tightening serving only to ensure that the assembly is rigidly made, and is sealed. In practice, various solutions can be found for making the internal contacts within the cavity defined in each pair of parts. Such contacts can be effected for example by means of a liquefied alloy or metal or by one or more springs which bear against each of the two parts to be brought into electrical contact. Such springs can be, for example, formed of a multiplicity of resilient plates or can be in the shape of coil springs, possibly provided with graphite and pieces connected by conducting braids.

Obviously, the internal surfaces of the cavities within which the contacts are made can be treated in any known manner for improving the contact, whether by scouring, increasing the surface areas, various metal deposits or any other method.

It is obvious that such constructions require that the assembly of the pairs of parts should be sealed, which can conveniently be effected by means of one or more seal means made of elastomers which are resistant to the electrolytic medium in question.

It is apparent that using electrolytically-active portions (anodes and cathodes), of which at least one is apertured or of a foraminous nature, requires the provision of a partition between the portions, in order to prevent the electrolytically active portions being attacked, or even to prevent the anolyte mixing with the catholyte, and the current leakage which would result. Such a partition can comprise materials which are not liable to attack either by the anolyte or by the catholyte, such as some plastics materials, or it can comprise a metal wall which can have two faces of different nature, but which are not liable to attack by the electrolyte with which each of the faces is in contact. When the partition wall is metal, it can be welded to the parts forming a pair, which parts are welded to the electrolytically active portions. When the partition is of a non-metallic material, it can be tightened on to the parts of the same electrolytically active portion or between the parts forming pairs. In these various cases, sealing is ensured by means of seal means which can be the same as those intended to seal the two parts forming each pair relative to each other.

SPECIFIC DESCRIPTION OF THE INVENTION

Many alternative embodiments of bipolar electrodes can be produced and are part of the present invention. Some embodiments are described hereinafter by way of example and illustration.

In order to disclose more clearly the nature of the present invention, the following examples illustrating the invention are given. It should be understood, however, that this is done solely by way of example and is intended neither to delineate the scope of the invention nor limit the ambit of the appended claims.

Example 1

Figure 2:
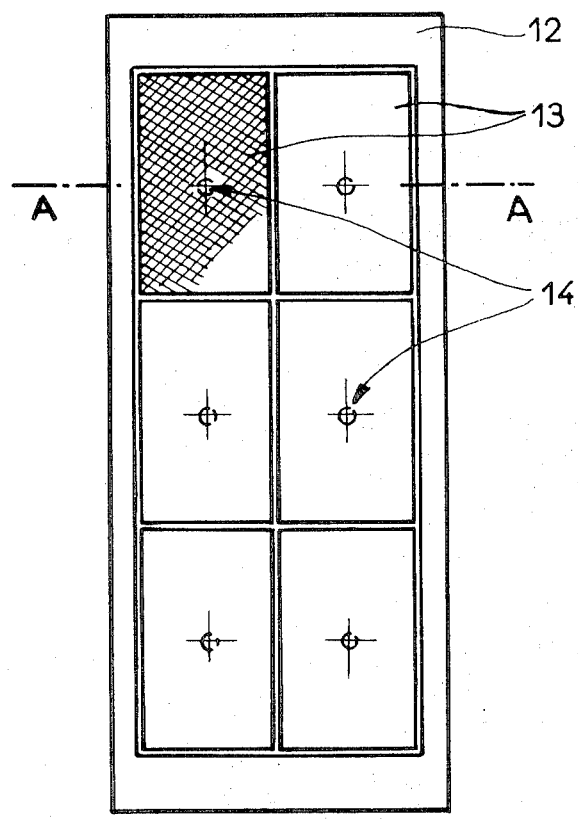
FIG. 2 is a complete electrode according to the invention.
Figure 3:
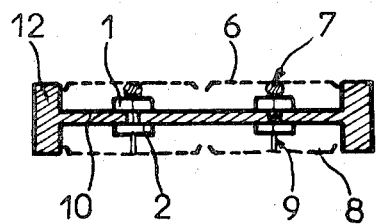
FIG. 3 is a cross-section of the electrode taken along the line A—A of FIG. 2.

This example describes the embodiment of FIGS. 1, 2 and 3 of the accompanying drawings. FIG. 1 shows a detail of one of the pairs of parts, and a part of the anodic and cathodic portions of the bipolar electrode which are welded thereto. Reference 1 denotes one of the parts of the pair, which comprises titanium, and reference 2 denotes the second part which comprises mild steel. These two parts are tightened together by means of a screw 3, with the interposition of a sealing gasket 4. The electrical contact between the two parts is effected by means of the ring 5 carrying resilient plate members, each of which bears simultaneously against the internal surfaces of the two parts 1 and 2. The anodic portion of the bipolar electrode comprises an expanded apertured or foraminous titanium sheet 6 welded to the part 1 by means of a jointly-drawn member 7 of copper and titanium which extends over the entire height of the electrode and acts as a spacer member. The cathode 8 which comprises a mild steel wire open grid is welded to the other part 2 of the pair, through the intermediary of a mild steel plate 9 which also extends over the entire height of the trode and which acts as a spacer member. Separation of the anolyte and the catholyte is ensured by a polyester partition 10 which is gripped between the two parts 1 and 2, sealing being effected by seal means 11.

FIG. 2 shows a complete electrode, and FIG. 3 shows a cross-section of the electrode, through two pairs of parts for making an electrical connection between the anodic and cathodic portions. Reference 12 denotes a polyester frame which is provided with a veil means which is the partition 10 for separating the anodic portion 6 and the cathodic portion 8 of each of the six electrode elements 13 forming the complete electrode. The pairs of parts 1 and 2 are denoted by reference 14. Reference 7 denotes the copper-titanium members which are drawn jointly, acting as spacer members between the anodic portions 6 and the parts 1, while reference 9 denotes the mild steel plates acting as spacer members between the cathodic portions 8 and the parts 2. Details of the sealing gaskets and the clamping screws are not shown in FIGS. 2 and 3.

Example 2

Figure 4:
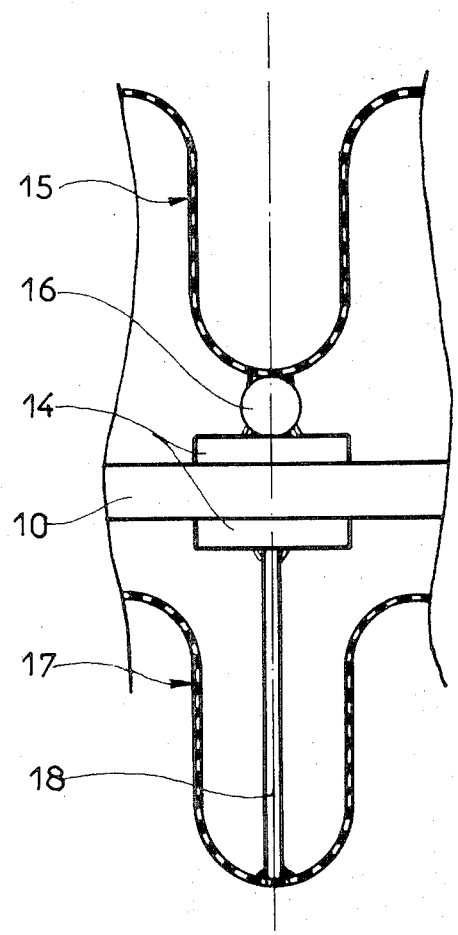
FIG. 4 shows a form of a portion of another embodiment of the invention, in which the coupled anodic and cathodic portions are corrugated to increase surface area.

This example relates to FIG. 4 of the accompanying drawings, and relates to the use of a coupling device according to the present invention in a bipolar electrode in which the anodic and cathodic portions are corrugated in order to increase the contact surface area. Reference 14 diagrammatically denotes a pair of parts identical to those described in the preceding example, the sealing means and the tightening means not being shown in this Figure. The partition is diagrammatically indicated by reference 10.

The anodic portion 15 which comprises an expanded apertured and corrugated sheet of titanium covered with platinum is welded to the corresponding part of the pair by means of a copper-titanium jointly-drawn member acting as a spacer member 16; the corrugated cathodic portion 17 which comprises a mild steel open grid is welded to the corresponding part of the pair 14 by means of a mild steel plate 18 acting as a spacer member.

By correspondence of the projecting of one electrode and the recessed parts of the electrode which follows it immediately in a cell using a series thereof, such an arrangement provides for a very substantial increase in the electrolytic surface area.

As will be apparent to those skilled in the art, components of titanium, may be replaced by components of similar construction comprised of other film-forming metals.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. Dismantleable bipolar electrodes in which the anodically active portion comprises a film-forming metal or alloy thereof, covered with a corrosion-resistant, electrical-conducting layer, and in which the cathodically active portion comprises a metal which can be used cathodically, characterized in that said active portions are separated in space, at least one of said active portions being apertured, an electrical contact between said portions being produced by means of two series of parts, each of said series being mechanically and electrically fixed with respect to one of said portions, the corresponding parts of each series being of shapes such that once connected in order to form pairs of parts, said pairs define a sealed cavity for housing a device or means for establishing an electrical contact between the parts of each pair.

2. Dismantleable bipolar electrodes according to Claim 1, including means for establishing an electrical contact between the parts of each pair placed in said sealed cavity, said means being a resilient means.

3. Dismantleable bipolar electrodes according to Claim 1, including means for establishing an electrical contact between the parts of each pair placed in said sealed cavity, said means being a metal or alloy in the liquid state.

4. Dismantleable bipolar electrodes according to Claim 1, characterized in that said series of parts forming the pairs are respectively and directly welded to each of the electrolytically active portions.

5. Dismantleable bipolar electrodes according to Claim 1, characterized in that the electrolytically active portions are planar.

6. Dismantleable bipolar electrodes according to Claim 1, characterized in that at least one of the electrolytically active portions has an active surface area which is greater than the projected surface area of the whole of the electrode.

7. Dismantleable bipoar electrodes according to Claim 1, characterized in that at least one of said series of parts forming the pairs is welded to the electrolytically active portion which corresponds thereto by way of spacer members.

8. Dismantleable bipolar electrodes according to Claim 7, characterized in that said spacer members of the anodically active portion are formed of a metal which is a good conductor, sheathed with a film-forming metal or alloys thereof.

9. Dismantleable bipolar electrodes according to Claim 1, characterized in that the electrolytically active portions are separated by a partition.

10. Dismantleable bipolar electrodes according to Claim 9, characterized in that said partition is metal.

11. Dismantleable bipolar electrodes according to Claim 9, characterized in that said partition is electrically insulating and unaffected by corrosion.

12. Dismantleable bipolar electrodes according to Claim 9, characterized in that said partition is gripped between the parts forming the pairs within which is housed the means for establishing the electrical contact.

13. Dismantleable bipolar electrodes according to Claim 9, characterized in that said partition is gripped between the parts which are fixed with respect to one of said electrolytically active portions.

14. Dismantleable bipolar electrodes according to Claim 9, characterized in that said partition is welded to the parts of one of said electrolytically active portions.

References Cited

UNITED STATES PATENTS 1,502,708  7/1924  Allan _____ 204—286

JOHN H. MACK, Primary Examiner

W. I. SOLOMON, Assistant Examiner

U.S. Cl. X.R.

204—254, 256, 268, 283, 286

UNITED STATES PATENT OFFICE
CERTIFICATE OF CORRECTION

Patent No. 3,824,173                   Dated July 16, 1974

Inventor(s) Bouy et al.

It is certified that error appears in the above-identified patent and that said Letters Patent are hereby corrected as shown below:

Column 2, line 22, the word "partion" should be "partition."

Column 2, line 39, the word "difficulty" should be "differently".

Column 4, line 18, the word "trode" should be "electrode".

Signed and sealed this 29th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,824,173  Dated July 16, 1974

Inventor(s) Bouy et al.

It is certified that error appears in the above-identified patent and that said Letters Patent are hereby corrected as shown below:

Column 1, subsequent to Line 8, the following should appear:

Assignee: Rhone-Progil, Paris, France

Signed and sealed this 19th day of November 1974.

(SEAL)
Attest:

McCOY M. GIBSON JR.
Attesting Officer

C. MARSHALL DANN
Commissioner of Patents